US010298345B2

United States Patent
Yang et al.

(10) Patent No.: US 10,298,345 B2
(45) Date of Patent: May 21, 2019

(54) CLOCK SYNCHRONIZATON USING CODEWORD MARKER

(71) Applicant: GLOBALFOUNDRIES INC., Grand Cayman (KY)

(72) Inventors: Kai Yang, Beijing (CN); Bin Sun, Beijing (CN); Yuan Yao, Beijing (CN); Zhen Han, Beijing (CN)

(73) Assignee: GLOBALFOUNDRIES INC., Grand Cayman (KY)

( * ) Notice: Subject to any disclaimer, the term of this patent is extended or adjusted under 35 U.S.C. 154(b) by 168 days.

(21) Appl. No.: 15/406,350

(22) Filed: Jan. 13, 2017

(65) Prior Publication Data

US 2018/0205477 A1 Jul. 19, 2018

(51) Int. Cl.
*H04J 3/06* (2006.01)
(52) U.S. Cl.
CPC .................. *H04J 3/0667* (2013.01)
(58) Field of Classification Search
CPC ............................. H04J 3/0658; H04J 3/0644
See application file for complete search history.

(56) References Cited

U.S. PATENT DOCUMENTS

2009/0034589 A1* 2/2009 Hahm .................. H04B 1/7075
375/150
2014/0092918 A1 4/2014 Jost

OTHER PUBLICATIONS

LAN/MAN Standards Committee, IEEE P802.3by/D3.2, Draft Standard for Ethernet Amendment 2: Media Access Control Parameters, Physical Layers and Management Parameters for 25 Gb/s Operation, pp. 243, Mar. 29, 2016.
Technical Committee on Sensor Technology, IEEE Standard for a Precision Clock Synchronization Protocol for Networked Measurement and Control Systems, pp. 289, Jul. 24, 2008.

* cited by examiner

*Primary Examiner* — Rhonda L Murphy
(74) *Attorney, Agent, or Firm* — David Cain; Hoffman Warnick LLC

(57) ABSTRACT

Aspects of the present disclosure includes a method and program product for clock synchronization of a networked computer system. The method records a time (t1) when a first codeword marker in a datastream is sent from a master computer to a slave computer and records a second time (t2) when the slave computer receives the first codeword marker. The method includes recording a third time (t3) when a third codeword marker in a datastream is sent from the slave computer to the master computer. The method includes recording a fourth time t4 when the master receives the third codeword marker from the slave. The method calculates a time offset θ, according to;

$$\theta = \frac{(t2-t1)+(t4-t3)}{2},$$

and a roundtrip delay δ, according to δ=(t4−t1)−(t3−t2). The clock in the slave computer is synchronized with a clock in the master computer using θ and δ.

20 Claims, 6 Drawing Sheets

CLOCK SYNCHRONIZATON USING CODEWORD MARKER

FIELD OF THE INVENTION

The present application relates to synchronization of clocks in integrated computer systems.

BACKGROUND

Clock synchronization protocols, e.g. NTP (Network Time Protocol) and IEEE1588-2008, are used for a precision clock synchronization of networked measurement and control and commonly integrated in communication network and computer network systems such as an Ethernet. The accuracy of these mechanisms is important as it affects the accuracy of clock in local system. Increasingly, sub-nanosecond accuracy is required to achieve high performance applications, especially when there are numerous number of network nodes. However, clock synchronization protocols, such as IEEE1588, insert specific frames from a media access controller (MAC). This requires additional overhead and additional bandwidth of the network.

BRIEF SUMMARY

A first embodiment of the present disclosure provides a method for clock synchronization of a networked computer system. The method includes recording a time (t1) when a first codeword marker in a datastream is sent from a master computer to a slave computer and recording a second time (t2) when the slave computer receives the first codeword marker. The method includes sending a second codeword marker in the datastream from the master computer to the slave computer, the second codeword marker containing the first time t1. The method includes recording a third time (t3) when a third codeword marker in a datastream is sent from the slave computer to the master computer. The third codeword marker is the first available codeword marker after receipt by the slave computer of the second codeword marker. The method includes recording a fourth time t4 when the master receives the third codeword marker from the slave. The method includes sending a fourth codeword marker in the datastream from the master computer to the slave computer, the fourth codeword marker containing the fourth time t4. The method includes calculating a time offset θ, according to;

$$\theta = \frac{(t2-t1)+(t4-t3)}{2},$$

and calculating a roundtrip delay δ, according to δ=(t4−t1)−(t3−t2). The clock in the slave computer is synchronized with a clock in the master computer using θ and δ.

A second embodiment of the present disclosure provides a program product stored on a computer readable storage medium, the program product operative to synchronize clocks within a computer network containing a master computer and a slave computer. The computer readable storage medium includes program code for recording a time (t1) when a first codeword marker in a datastream is sent from a master computer to a slave computer and recording a second time (t2) when the slave computer receives the first codeword marker. The method includes sending a second codeword marker in the datastream from the master computer to the slave computer, the second codeword marker containing the first time t1. The method includes recording a third time (t3) when a third codeword marker in a datastream is sent from the slave computer to the master computer. The third codeword marker is the first available codeword marker after receipt by the slave computer of the second codeword marker. The method includes recording a fourth time t4 when the master receives the third codeword marker from the slave. The method includes sending a fourth codeword marker in the datastream from the master computer to the slave computer, the fourth codeword marker containing the fourth time t4. The method includes calculating a time offset θ, according to;

$$\theta = \frac{(t2-t1)+(t4-t3)}{2},$$

and calculating a roundtrip delay δ, according to δ=(t4−t1)−(t3−t2). The clock in the slave computer is synchronized with a clock in the master computer using θ and δ.

A third embodiment of the present disclosure provides a computer-implemented method for synchronizing clocks within a computer network containing a master computer and a slave computer. The method includes using a computing device to perform actions including recording a time (t1) when a first codeword marker in a datastream is sent from a master computer to a slave computer and recording a second time (t2) when the slave computer receives the first codeword marker. The method includes sending a second codeword marker in the datastream from the master computer to the slave computer, the second codeword marker containing the first time t1. The method includes recording a third time (t3) when a third codeword marker in a datastream is sent from the slave computer to the master computer. The third codeword marker is the first available codeword marker after receipt by the slave computer of the second codeword marker. The method includes recording a fourth time t4 when the master receives the third codeword marker from the slave. The method includes sending a fourth codeword marker in the datastream from the master computer to the slave computer, the fourth codeword marker containing the fourth time t4. The method includes calculating a time offset θ, according to;

$$\theta = \frac{(t2-t1)+(t4-t3)}{2},$$

and calculating a roundtrip delay δ, according to δ=(t4−t1)−(t3−t2). The clock in the slave computer is synchronized with a clock in the master computer using θ and δ.

BRIEF DESCRIPTION OF THE DRAWINGS

These and other features of this disclosure will be more readily understood from the following detailed description of the various aspects of the invention taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

The disclosure will now be described by reference to the accompanying figures. In the figures, various aspects of the structures have been shown and schematically represented in a simplified manner to more clearly describe and illustrate the disclosure. For example, the figures are not intended to be drawn to scale. In addition, the vertical cross-sections of the various aspects of the structures are illustrated as being rectangular in shape. Those skilled in the art will appreciate, however, that with practical structures these aspects will most likely incorporate more tapered features. Moreover, the disclosure is not limited to constructions of any particular shape.

Figure 1:
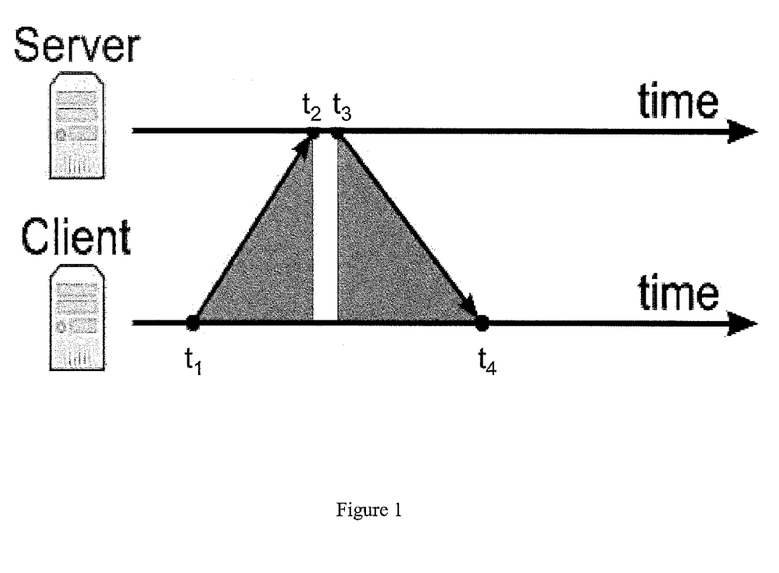
FIG. 1 illustrates the time offset and round trip delay between a server computer and a client computer in a networked system.

To synchronize a clock in a computer network having a server computer and a client computer or a master computer and a slave computer, the client must compute their time offset and round-trip delay. Referring to FIG. 1, time offset θ is defined by Equation 1.

$$\theta = ((t_2 - t_1) + (t_4 - t_3))/2 \quad \text{(Equation 1)}$$

Round-trip delay δ is defined by Equation 2

$$\delta = (t_4 - t_1) - (t_3 - t_2) \quad \text{(Equation 2)}.$$

Wherein $t_1$ is the client's time stamp when requesting a packet transmission from the server; $t_2$ is the server's time stamp when the server receives the request from the client; $t_3$ is the server's time stamp when the server sends the response packet to the client; and $t_4$ is the client's time stamp when the client receives the response packet reception from the server.

The disclosure here provides a method, program product and computer-implemented method to achieve clock synchronization in a computer networked system by leveraging the codeword marker (CWM) mechanism that is present in computer systems using Ethernet protocols. During data transmission over a networked computer system, codeword alignment on the receive side (IEEE 802.3BY, section 108.5.2.4), and codeword alignment of the transmit side (25GBASE-R RS-FEC) periodically insert CWMs into the stream of transcoded blocks at predefined locations, typically the first 257 bits of every $1024^{th}$ Reed-Soloman Forward Error Correction (RS-FEC) codeword. According to the specifications cited above, the first 64 bits of the codeword marker are used for codeword alignment and the last bit of the codeword marker is set to 0. The other 192 bits of the codeword marker are left blank and are not used by any function. By using these 192 bits as a codeword marker time stamp (CMTS), clock synchronization between a server computer and a client computer or master computer and slave computer is achieved.

Figure 2:
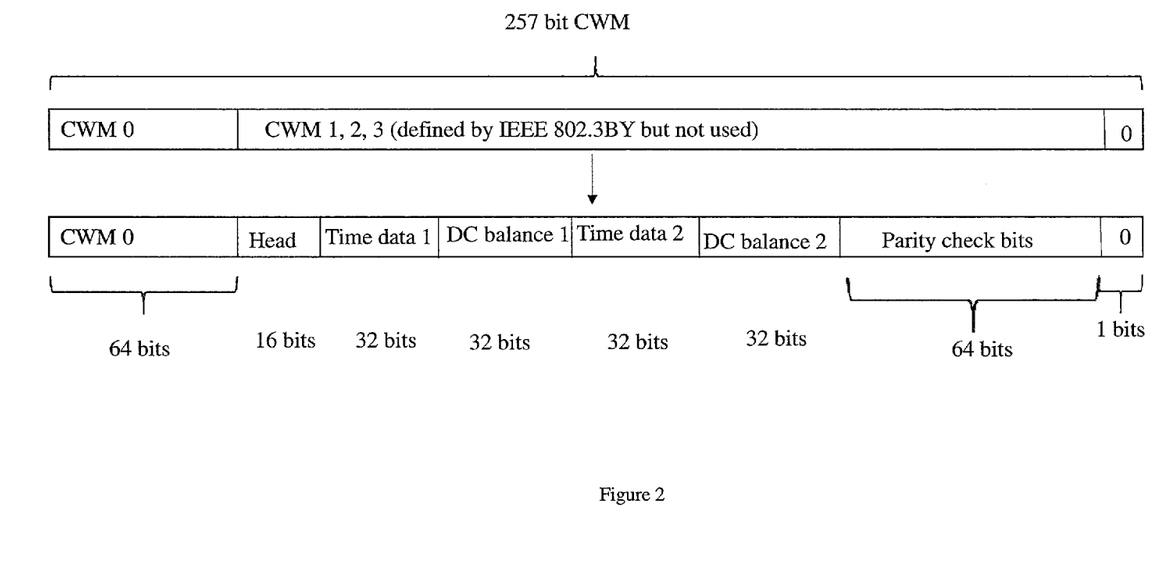
FIG. 2 illustrates a codeword marker and the allocation of its bits.

As shown in FIG. 2, there is a schematic of a 257 bit CWM. Only the first 64 bits are used to support codeword alignment. The last bit is set to 0 and is also used to support codeword alignment. However, the middle 192 bits are not used in codeword alignment.

FIG. 2 shows the allocation of bits used for each CMTS used in the CWM disclosed herein. The Head is used to record the type of CMTS. The types of CMTS are; 1. Master_Req, 2. Master_Follow, 3. Slave_Req, and 4. Master_Resp. Time data 1 records the current elapsed time in second since the UNIX epoch (Jan. 1, 1970). DC Balance 1 records the balance bits for Time data 1. Time data 2 records time accuracy to $2^{-32}$ seconds. DC Balance 2 records the balance bits for Time data 2. The parity check bits are optional. The parity check bits are generated based on Hamming (7, 4) algorthim. The parity bits are linear error-correcting codes that can detect up to two-bit errors or correct one-bit errors without detection of uncorrected errors. The last bit is set to zero according to IEEE802.3B Y.

Figure 3:
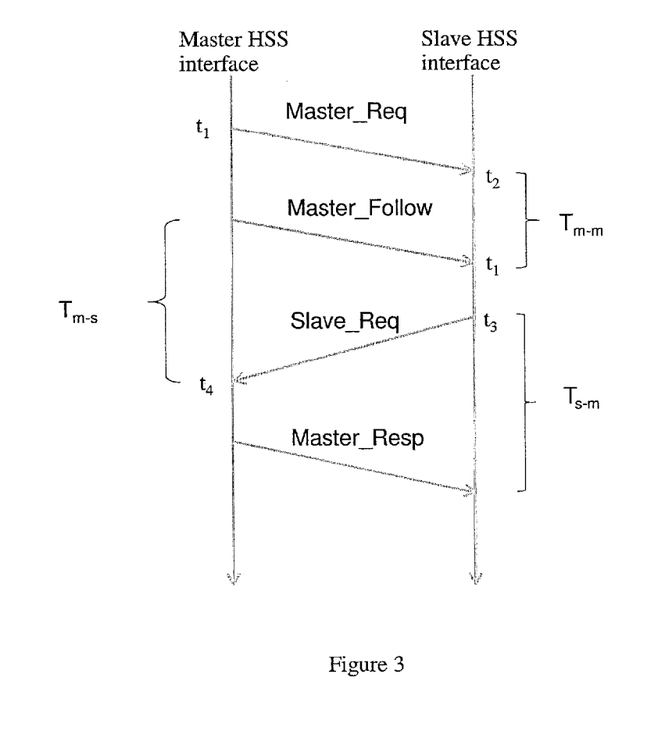
FIG. 3 illustrates codeword marker time stamps used for clock synchronization in a computer network.

There are four kinds of CMTS frames transmitted between Master and Slave in CMTS system disclosed herein. FIG. 3 shows the time relationship and labeling of the CMTS frames. The downward pointing arrows for the Master HSS interface and Slave HSS interface represent elapsed time. The right side represent the Master and the left side represents the Slave. At the beginning, there is transmission, for example, CMTS TX, on Master side. The Master will record time $t_1$ when CMTS TX is detected at the start of codeword marker. Time stamp t2 is generated to record arrival time of Master_Req by the Slave. When next codeword marker is detected by the Master after sending Master_Req, the Master transmits Master_Follow to the Slave. Master_Follow frame is transmitted by Master to the Slave with time stamp t1 included in the CWM. This allows the Slave to receive time stamp $t_1$. The first CWM after the Slave receives Master_Follow is recorded as time stamp $t_3$ by the Slave. The Slave sends first codeword marker after the Slave receives Master_Follow to the Master. This time frame is labeled Slave_Req frame. Master detects Slave_Req frame and generates time stamp t4 when this frame reaches HSS interface of the Master. The Master puts t4 into Master_Resp frame and transmits this to the Slave when next 257-bits codeword marker after receipt by the Master of Slave_Resp. Slave recieves Master_Resp containing t4 in the CWM and Slave has t1, t2, t3 and t4. Slave uses the four time stamps t1, t2, t3, t4 to calculate clock offset and latency.

The offset and latency are calculated using the following formulas. The time offset θ is obtained through $$\theta = \frac{(t2 - t1) + (t4 - t3)}{2}.$$

The latency or roundtrip delay δ is obtained by the formula: δ=(t4−t1)−(t3−t2). The clock in the slave computer is synchronized with a clock in the master computer using θ and δ.

Guard timers described herein are used to determine whether synchronization of the clocks needs to be initiated. Guard timers are described with reference to FIG. 3. Using the interval of two CWMs as the base unit to set these timers. For example, after the computer network is installed, the interval between two CWMs can be determined. This varies with the computer system network and can be adjusted periodically as the network changes due to addition of more nodes in the network, upgrading of components or changes in the configuration.

Because the time stamp is contained CWM, the interval of two CWM is used as the base unit to set the guard timers. This simplifies the hardware logic. Guard Timer value is equal to the system operation time plus the "delay of the transmission." For Timer$_{m-m}$, the "system operation time" is set to one CWM interval or $t_2$-$t_1$. For Timer$_{s-m}$ and Timer$_{m-s}$, the "system operation time" is set to two CWM intervals. The delay of transmission" is set to one CWM interval for all Guard timers; Timer$_{m-m}$, Timer$_{s-m}$ and Timer$_{m-s}$.

Thus, for setting Guard Timers, the interval between two CWMs would be t2-t1. This value is doubled to set the guard timer limit for T$_{m-m}$. That is the sum of system operation time and delay of transmission. The Guard Timer T$_{m-s}$ and T$_{s-m}$ are triple the interval between two CWMs, that, the sum of system operation time and delay of transmission.

The three Guard timers; T$_{m-m}$,T$_{m-s}$ and T$_{s-m}$ are used as follows. When the Slave receives "Master_Req," timer T$_{m-m}$ is initiated. If T$_{m-m}$ exceeds the guard timer limit before the Slave receives "Master_Follow," from the Master, the Slave will reset its finite state machine (FSM), that is, the clock synchronization method described above will be initiated.

For example, if the interval between two CWMs for a system is 209.7152 microsecond, then the guard timer limit for T$_{m-m}$ would be 419.4304 μsec (two intervals). If T$_{m-m}$ are exceeds 419.4304 μsec before receipt of Master_Follow during the transmission of CWMs described above, clock synchronization is initiated.

When the Master sends "Master_Follow," T$_{m-s}$ is initiated by the Master. If T$_{m-s}$ exceeds the guard timer limit before the Master receives "Slave_Req," the Master will reset its finite state machine (FSM), that is, the clock synchronization method described above will be initiated.

Using the example described, the interval between two CWMs for a system is 209.7152 microsecond, then the guard timer limit for T$_{m-m}$ is 629.1456 μsec (three intervals). If T$_{m-m}$ exceeds 629.1456 μsec before receipt of Slave_Req during the transmission of CWMs described above, clock synchronization is initiated.

When the Slave sends "Slave_Req," Slave T$_{s-m}$ is initiated by the Slave. If T$_{s-m}$ exceeds the guard timer limit before the Slave receives "Master_Resp", the Slave will reset its finite state machine (FSM), that is, the clock synchronization method described above will be initiated.

Using the example described, the interval between two CWMs for a system is 209.7152 microsecond, then the guard timer limit for T$_{s-m}$ is 629.1456 μsec (three intervals). If T$_{s-m}$ exceeds 629.1456 μsec before receipt of Master_Req during the transmission of CWMs described above, clock synchronization is initiated.

Figure 4:
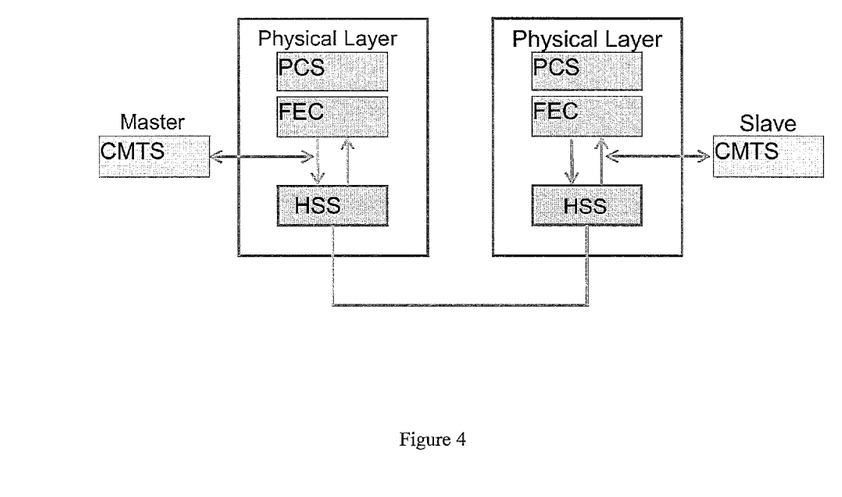
FIG. 4 illustrates physical layers in a computer network and the application of the codeword marker time stamps within the physical layers.

In order to obtain the highest accuracy for the clock synchronization disclosed herein, the location of the CMTS unit should be as close to physical layer as possible. In FIG. 4, the CMTS location is shown for the Master and the Slave. The physical layer of each of the Master and Slave includes the Physical Coding Sublayer (PCS), the Forward Error Correction (FEC) and the High Speed SerDes (HSS) interface. PCS is a networking protocol sublayer in the Fast Ethernet, Gigabit Ethernet, and 10 Gigabit Ethernet standards. The frame structure of CMTS packet can be detected at the interface between the FEC and HSS interface as described above.

This allows to delay of the HSS to be precisely calculated. By arranging the CMTS logic at the interface between the FEC and HSS the various delays from all the TX/RX logic are avoided.

Figure 5:
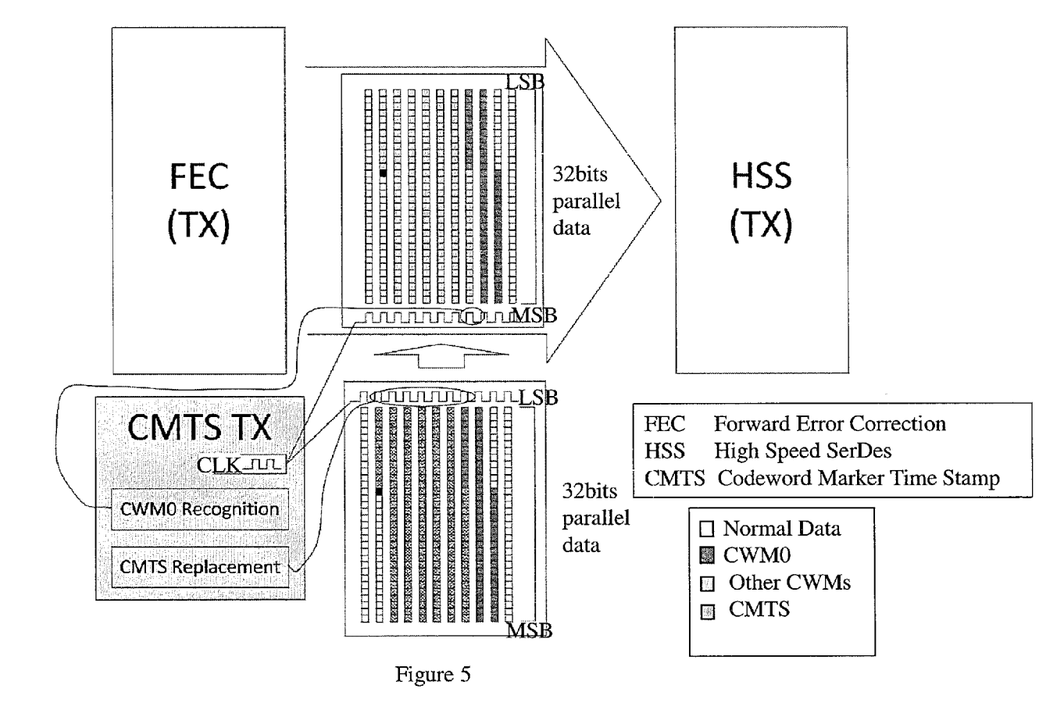
FIG. 5 illustrates the transmission of the codeword marker time step within a computer network.

Shown in FIG. 5 is a description of the CMTS unit when either the slave or Master transmits a CWM. The code word marker is recognized by the transmitting unit of either the Master or the Slave, designated CWM0 recognition in FIG. 5. The empty bits in the CWM are replaced with the CMTS frames described in FIG. 3 for the message being transmitted either Master_Req, Master_Follow, Slave_Req or Master-_Resp. The CWM including the CMTS replacement is inserted in the physical layer and transmitted.

Figure 6:
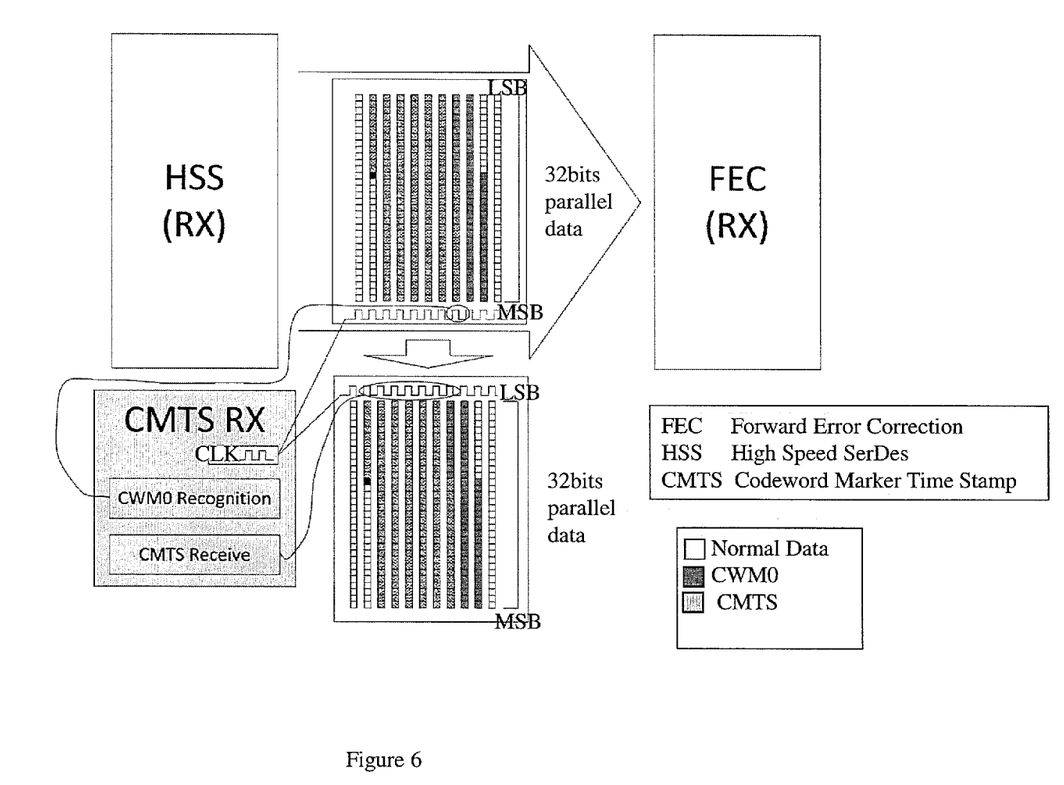
FIG. 6 illustrates the receipt of the codeword marker time step within a computer network.

Shown in FIG. 6 is a description of the CMTS unit when either the slave or Master is receiving a CWM. The CWM is received through the HSS interface. The CWTS unit recognizes CDW, designated CWM0 recognition in FIG. 6. The bits inserted in the CWM are identified and translated by the CMTS unit for the message being transmitted either Master_Req, Master_Follow, Slave_Req or Master_Resp. This information is stored and used when clock synchronization is required.

The clock synchronization described is applicable to 25G Ethernet mode, 25G Ethernet PHY mode and other Ethernet PHY using codeword marker mechanisms. The clock synchronization applies to the Ethernet PHY protocols which are single lane, use a marker to sync the link and have enough unused bits in the codeword marker to insert the time stamp.

The clock synchronization leverages codeword markers and eliminates additional overhead required by other methods. The clock synchronization fully complies with IEEE802.3 25G and other modes that using codeword marker mechanisms. The accuracy of the clock can be in the sub nanosecond range. The clock synchronization process is completed in 1 msec or less.

Any combination of one or more computer readable medium(s) may be used to implement the CMTS unit described herein and shown in FIG. 4. A computer readable storage medium may be, for example, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to the methods, apparatus (systems) and computer program products according to embodiments of the invention. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified.

These computer program instructions may also be stored in a computer readable medium that can direct a computer, other programmable data processing apparatus, or other devices to function in a particular manner, such that the instructions stored in the computer readable medium produce an article of manufacture including instructions which implement the functions. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions.

The FIGs. illustrate the architecture, functionality, and operation of possible implementations of systems, methods and computer program products according to various embodiments of the present invention.

As used herein, the term "configured," "configured to" and/or "configured for" can refer to specific-purpose features of the component so described. For example, a system or device configured to perform a function can include a computer system or computing device programmed or otherwise modified to perform that specific function. In other cases, program code stored on a computer-readable medium (e.g., storage medium), can be configured to cause at least one computing device to perform functions when that program code is executed on that computing device. In these cases, the arrangement of the program code triggers specific functions in the computing device upon execution. In other examples, a device configured to interact with and/or act upon other components can be specifically shaped and/or designed to effectively interact with and/or act upon those components. In some such circumstances, the device is configured to interact with another component because at least a portion of its shape complements at least a portion of the shape of that other component. In some circumstances, at least a portion of the device is sized to interact with at least a portion of that other component. The physical relationship (e.g., complementary, size-coincident, etc.) between the device and the other component can aid in performing a function, for example, displacement of one or more of the device or other component, engagement of one or more of the device or other component, etc.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

We claim:

1. A method for clock synchronization of a networked computer system, the method comprising:
    recording a time (t1) when a first codeword marker in a datastream is sent from a master computer to a slave computer;
    recording a second time (t2) when the slave computer receives the first codeword marker;
    sending a second codeword marker in the datastream from the master computer to the slave computer, the second codeword marker containing the first time (t1), wherein sending the second codeword marker includes inserting the second codeword marker into a stream of transcoded blocks transmitted over a network computer system at predefined locations within the datastream;
    recording a third time (t3) when a third codeword marker in the datastream is sent from the slave computer to the master computer, wherein the third codeword marker is a first available codeword marker after receipt of slave computer of the second codeword marker;
    recording a fourth time (t4) when the master computer receives the third codeword marker from the slave;
    sending a fourth codeword marker in the datastream from the master computer to the slave computer, the fourth codeword marker containing the fourth time (t4), wherein sending the fourth codeword marker includes inserting the fourth codeword marker into a stream of transcoded blocks transmitted over a network computer system at predefined locations within the datastream;
    calculating a time offset θ, according to $$\theta = \frac{(t2-t1)+(t4-t3)}{2};$$

calculating a roundtrip delay δ, according to δ=(t4−t1)−(t3−t2); and
    synchronizing a clock in the slave computer with a clock in the master computer using θ and δ to adjust the clock in the slave computer from an initial setting to a synchronized setting; and continuing operation of the master computer and the slave computer after adjusting the clock of the slave computer to the synchronized setting.

2. The method of claim 1, wherein the slave computer determines an elapsed time ($T_{mm}$) from receipt of the first codeword marker from the master computer to receipt of the second codeword marker from the master computer and if $T_{mm}$ is less than a predetermined value, clock synchronization is not initiated.

3. The method of claim 2, wherein the predetermined value is twice a time between two consecutive codeword markers.

4. The method of claim 1, wherein the master computer determines an elapsed time ($T_{ms}$) from sending of the second codeword marker to the slave computer to receipt of the third codeword marker from the slave computer and if $T_{ms}$ is less than a predetermined value, clock synchronization is not initiated.

5. The method of claim 4, wherein the predetermined value is triple a time between two consecutive codeword markers.

6. The method of claim 1, wherein the slave computer determines an elapsed time ($T_{sm}$) from sending of the third codeword marker to the master computer to receipt of the fourth codeword marker from the master computer and if $T_{sm}$ is less than a predetermined value, clock synchronization is not initiated.

7. The method of claim 6, wherein the predetermined value is triple a time between two consecutive codeword markers.

8. A program product stored on a non-transitory computer readable medium, the program product operative to synchronize clocks within a computer network containing a master computer and a slave computer, the non-transitory computer readable medium comprising program code for:
recording a time (t1) when a first codeword marker in a datastream is sent from the master computer to the slave computer;
recording a second time (t2) when the slave computer receives the first codeword marker;
sending a second codeword marker in the datastream from the master computer to the slave computer, the second codeword marker containing the first time (t1), wherein the program code for sending the second codeword marker inserts the second codeword marker into a stream of transcoded blocks transmitted over a network computer system at predefined locations within the datastream;
recording a third time (t3) when a third codeword marker in the datastream is sent from the slave computer to the master computer, wherein the third codeword marker is a first available codeword marker after receipt of slave computer of the second codeword marker;
recording a fourth time (t4) when the master computer receives the third codeword marker from the slave;
sending a fourth codeword marker in the datastream from the master computer to the slave computer, the fourth codeword marker containing the fourth time t4, wherein the program code for sending the fourth codeword marker inserts the fourth codeword marker into a stream of transcoded blocks transmitted over a network computer system at predefined locations within the datastream;

calculating a time offset θ, according to $$\theta = \frac{(t2-t1)+(t4-t3)}{2};$$

calculating a roundtrip delay δ, according to δ=(t4−t1)−(t3−t2); and
synchronizing a clock in the slave computer with a clock in the master computer, wherein the program code for synchronizing of the clock in the slave computer uses θ and δ to adjust the clock in the slave computer from an initial setting to a synchronized setting; and
continuing operation of the master computer and the slave computer after adjusting the clock of the slave computer to the synchronized setting.

9. The program product of claim 8, wherein the slave computer determines an elapsed time ($T_{mm}$) from receipt of the first codeword marker from the master computer to receipt of the second codeword marker from the master computer and if $T_{mm}$ is less than a predetermined value, clock synchronization, is not initiated.

10. The program product of claim 9, wherein the predetermined value is twice a time between two consecutive codeword markers.

11. The program product of claim 8, wherein the master computer determines an elapsed time ($T_{ms}$) from sending of the second codeword marker to the slave computer to receipt of the third codeword marker from the slave computer and if $T_{ms}$ is less than a predetermined value, clock synchronization is not initiated.

12. The program product of claim 11, wherein the predetermined value is triple a time between two consecutive codeword markers.

13. The program product of claim 8, wherein the slave computer determines an elapsed time ($T_{sm}$) from sending of the third codeword marker to the master computer to receipt of the fourth codeword marker from the master computer and if $T_{sm}$ is less than a predetermined value, clock synchronization is not initiated.

14. The program product of claim 13, wherein the predetermined value is triple a time between two consecutive codeword markers.

15. A computer-implemented method for synchronizing clocks within a computer network containing a master computer and a slave computer, the method comprising using a computing device to perform actions including:
recording a time (t1) when a first codeword marker in a datastream is sent from the master computer to the slave computer;
recording a second time (t2) when the slave computer receives the first codeword marker;
sending a second codeword marker in the datastream from the master computer to the slave computer, the second codeword marker containing the first time (t1), wherein sending the second codeword marker includes inserting the second codeword marker into a stream of transcoded blocks transmitted over a network computer system at predefined locations within the datastream;
recording a third time (t3) when a third codeword marker in the datastream is sent from the slave computer to the master computer, wherein the third codeword marker is a first available codeword marker after receipt of slave computer of the second codeword marker;
recording a fourth time (t4) when the master computer receives the third codeword marker from the slave;

sending a fourth codeword marker in the datastream from the master computer to the slave computer, the fourth codeword marker containing the fourth time t4, wherein sending the fourth codeword marker includes inserting the fourth codeword marker into a stream of transcoded blocks transmitted over a network computer system at predefined locations within the datastream;

calculating a time offset θ, according to $$\theta = \frac{(t2-t1)+(t4-t3)}{2};$$

calculating a roundtrip delay δ, according to δ=(t4−t1)−(t3−t2); and synchronizing a clock in the slave computer with a clock in the master computer, wherein the synchronizing of the clock in the slave computer includes using θ and δ to adjust the clock in the slave computer from an initial setting to a synchronized setting; and continuing operation of the master computer and the slave computer after adjusting the clock of the slave computer to the synchronized setting.

16. The computer-implemented method of claim 15, wherein the slave computer determines an elapsed time ($T_{mm}$) from receipt of the first codeword marker from the master computer to receipt of the second codeword marker from the master computer and if $T_{mm}$ is less than a predetermined value, clock synchronization is not initiated.

17. The computer-implemented method of claim 16, wherein the predetermined value is twice a time between two consecutive codeword markers.

18. The computer-implemented method of claim 15, wherein the master computer determines an elapsed time ($T_{ms}$) from sending of the second codeword marker to the slave computer to receipt of the third codeword marker from the slave computer and if $T_{ms}$ is less than a predetermined value, clock synchronization is not initiated.

19. The computer-implemented method of claim 18, wherein the predetermined value is triple a time between two consecutive codeword markers.

20. The computer-implemented method of claim 15, wherein the slave computer determines an elapsed time ($T_{sm}$) from sending of the third codeword marker to the master computer to receipt of the fourth codeword marker from the master computer and if $T_{sm}$ is less than predetermined value clock synchronization is not initiated.

* * * * *